(12) United States Patent
Yang et al.

(10) Patent No.: US 9,542,055 B2
(45) Date of Patent: Jan. 10, 2017

(54) SELF-CAPACITIVE TOUCH SCREEN AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Shengji Yang, Beijing (CN); Xue Dong, Beijing (CN); Haisheng Wang, Beijing (CN); Weijie Zhao, Beijing (CN); Yingming Liu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/802,165

(22) Filed: Jul. 17, 2015

(65) Prior Publication Data

US 2016/0216799 A1    Jul. 28, 2016

(30) Foreign Application Priority Data

Jan. 26, 2015    (CN) .......................... 2015 1 0038839

(51) Int. Cl.
*G06F 3/044*    (2006.01)
*G06F 3/041*    (2006.01)

(52) U.S. Cl.
CPC ............. *G06F 3/044* (2013.01); *G06F 3/0416* (2013.01); *G06F 2203/04112* (2013.01)

(58) Field of Classification Search
CPC ................... G03F 3/044; G03F 3/0416; G03F 2203/04112; G03F 2203/04111; G02F 1/13338
See application file for complete search history.

(56) References Cited

U.S. PATENT DOCUMENTS

2014/0210790 A1*    7/2014    Shin ........................ G06F 3/044
345/174

* cited by examiner

*Primary Examiner* — Abbas Abdulselam
(74) *Attorney, Agent, or Firm* — Ladas & Parry LLP

(57) ABSTRACT

A self-capacitive touch screen and a display device are disclosed. The self-capacitive touch screen includes a first substrate and a second substrate arranged opposite to each other. A conductive layer and a plurality of first touch electrodes are provided on the first substrate. The conductive layer includes a plurality of hollow areas distributed in a matrix. The first touch electrodes are in one-to-one correspondence with the hollow areas, and orthographic projections of the first touch electrodes on the first substrate are disposed in orthographic projections of the hollow areas on the first substrate. Second touch electrodes are formed in areas, which correspond to the conductive layer, on the second substrate. The second touch electrodes and the first touch electrodes are configured for the touch-control of the touch screen in the touch process.

10 Claims, 4 Drawing Sheets

SELF-CAPACITIVE TOUCH SCREEN AND DISPLAY DEVICE

TECHNICAL FIELD

Embodiments of the present disclosure relate to a self-capacitive touch screen and a display device.

BACKGROUND

Liquid crystal display (LCD) products have become mainstream products in current flat panel display devices due to the characteristics of small volume, low power consumption, no radiation, etc.

Currently, the capacitive touch technology has been widely applied in the field of LCD devices. Capacitive touch screens include in-cell self-capacitive touch screens and in-cell mutual-capacitance touch screens. Compared with in-cell mutual-capacitance touch screens, in-cell self-capacitive touch screen has the advantages of high signal-to-noise ratio (SNR) and low cost.

SUMMARY

At least one embodiment of the present disclosure provides a self-capacitive touch screen, which comprises a first substrate and a second substrate arranged opposite to each other. A conductive layer and a plurality of first touch electrodes are formed on the first substrate. The conductive layer includes a plurality of hollow areas distributed in a matrix. The first touch electrodes are in one-to-one correspondence with the hollow areas, and orthographic projections of the first touch electrodes on the first substrate are disposed in orthographic projections of the hollow areas on the first substrate. Second touch electrodes are formed in areas, which correspond to the conductive layer, on the second substrate. The second touch electrodes and the first touch electrodes are configured for the touch-control of the touch screen in the touch process.

At least one embodiment of the present disclosure further provides a display device, which comprises the foregoing self-capacitive touch screen.

Further scope of applicability of the present disclosure will become apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the following detailed description.

BRIEF DESCRIPTION OF THE DRAWINGS

Simple description will be given below to the accompanying drawings of the embodiments to provide a more clear understanding of the technical proposals of the embodiments of the present disclosure. Obviously, the drawings described below only involve some embodiments of the present disclosure but are not intended to limit the present disclosure.

REFERENCE NUMERALS

1. Conductive Layer; 2. First Touch Electrode; 21. Second Lead; 3. Second Touch Electrode; 31. Touch Sub-electrode; 311. First Sub-electrode; 312. Second Sub-electrode; 313. First Lead; 4. Touch Electrode; 5. Grid-like Electrode.

DETAILED DESCRIPTION

For more clear understanding of the objectives, technical proposals and advantages of the embodiments of the present disclosure, clear and complete description will be given below to the technical proposals of the embodiments of the present disclosure with reference to the accompanying drawings of the embodiments of the present disclosure. Obviously, the preferred embodiments are only partial embodiments of the present disclosure but not all the embodiments. All the other embodiments obtained by those skilled in the art without creative efforts on the basis of the embodiments of the present disclosure illustrated shall fall within the scope of protection of the present disclosure.

Touch electrodes of the in-cell self-capacitive touch screen may be multiplexed/reused as a common electrode, namely the touch electrodes are generally realized by a plurality of blocks divided by the common electrode. During a touch process, touch drive signals are applied to the touch electrodes, so that the touch electrodes can be used for the touch-control for the display panel. During a display process, common electrode signals are applied to the touch electrodes which are hence used in the display panel for display. Under the premise of ensuring the touch resolution, the size of the touch electrodes is required to some extent, and meanwhile, the ground load of the touch electrodes is also an important index for measuring the self-capacitive touch performance.

Figure 1:
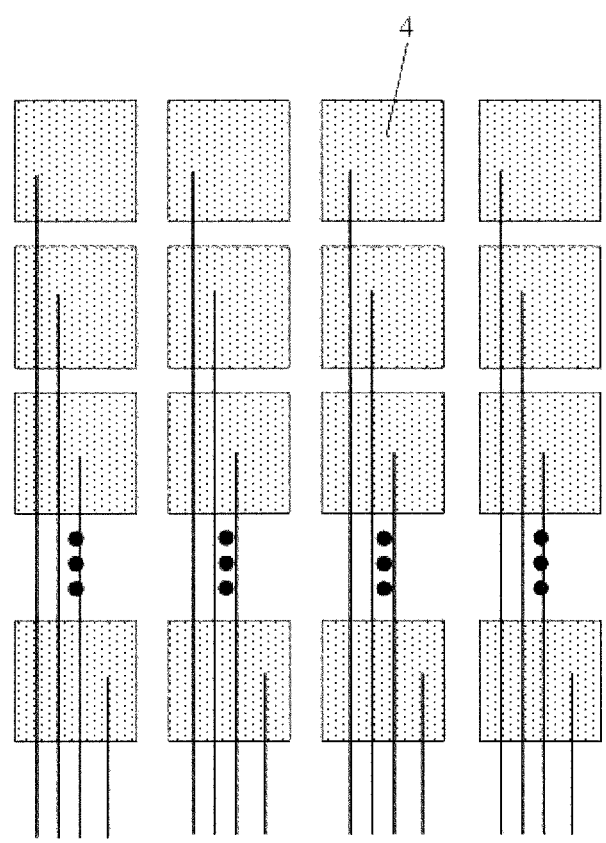
FIG. 1 is a schematic structural distribution view of touch electrodes in an in-cell self-capacitive touch screen.

FIG. 1 is a schematic structural distribution view of touch electrodes in an in-cell self-capacitive touch screen. As illustrated in FIG. 1, the entire common electrode may be uniformly divided into a plurality of divided electrodes, and these divided electrodes are all used as touch electrodes 4 during the touch process. In this way, although the problem of blind touch areas can be solved, the ground load of each touch electrode 4 is increased, and hence the touch electrodes 4 cannot satisfy the design requirement.

Figure 2:
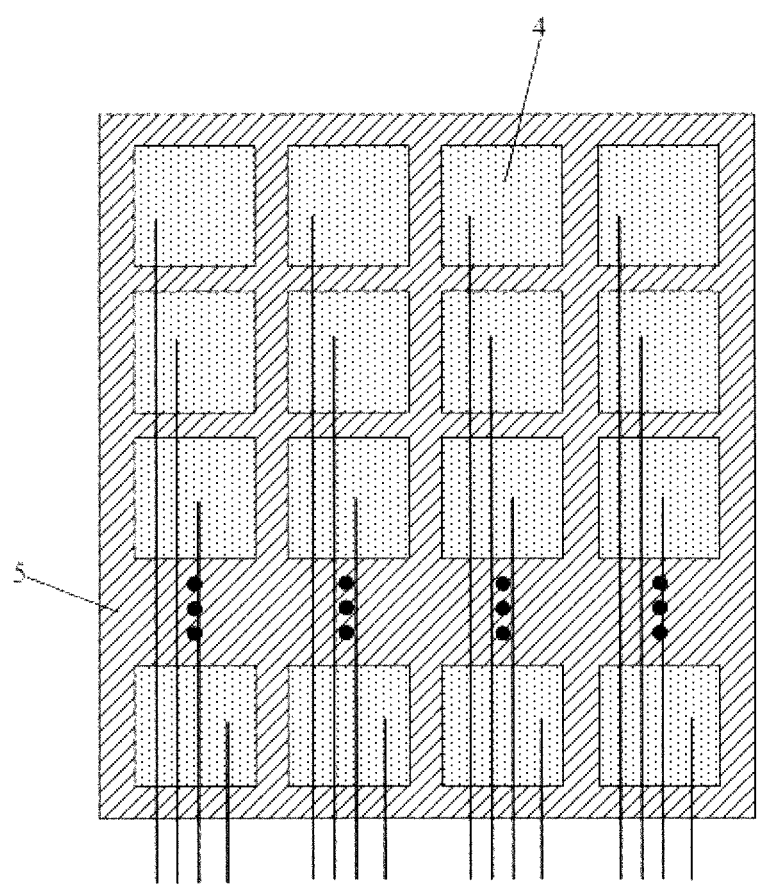
FIG. 2 is a schematic structural distribution view of touch electrodes in another in-cell self-capacitive touch screen.

FIG. 2 is a schematic structural distribution view of touch electrodes in another in-cell self-capacitive touch screen. In order to reduce the ground load of the touch electrodes, as illustrated in FIG. 2, the areas of touch electrodes 4 formed from the divided portions of a common electrode can be reduced, and subsequently, electrodes 5 which are grid-shaped as the whole are additionally arranged in spaced areas among the touch electrodes 4. The overall dimension of the grid-shaped electrodes 5 and the touch electrodes 4 is equal to the overall dimension of the common electrode, and hence the ground load of the touch electrodes 4 can satisfy the design requirement. However, as the areas of the touch electrodes 4 are reduced and the grid-shaped electrodes 5 have no touch function, the loss of touch performance can be caused to some extent, and hence the touch performance of the touch electrodes 4 can be reduced. Meanwhile, the touch accuracy and the touch effect of the touch electrodes can be also reduced.

Figure 3A:
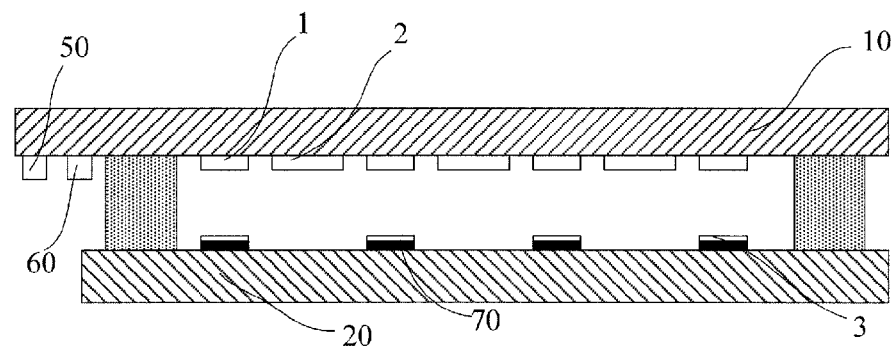
FIG. 3A is a schematic structural sectional view of the self-capacitive touch screen provided by an embodiment of the present disclosure.
Figure 3B:
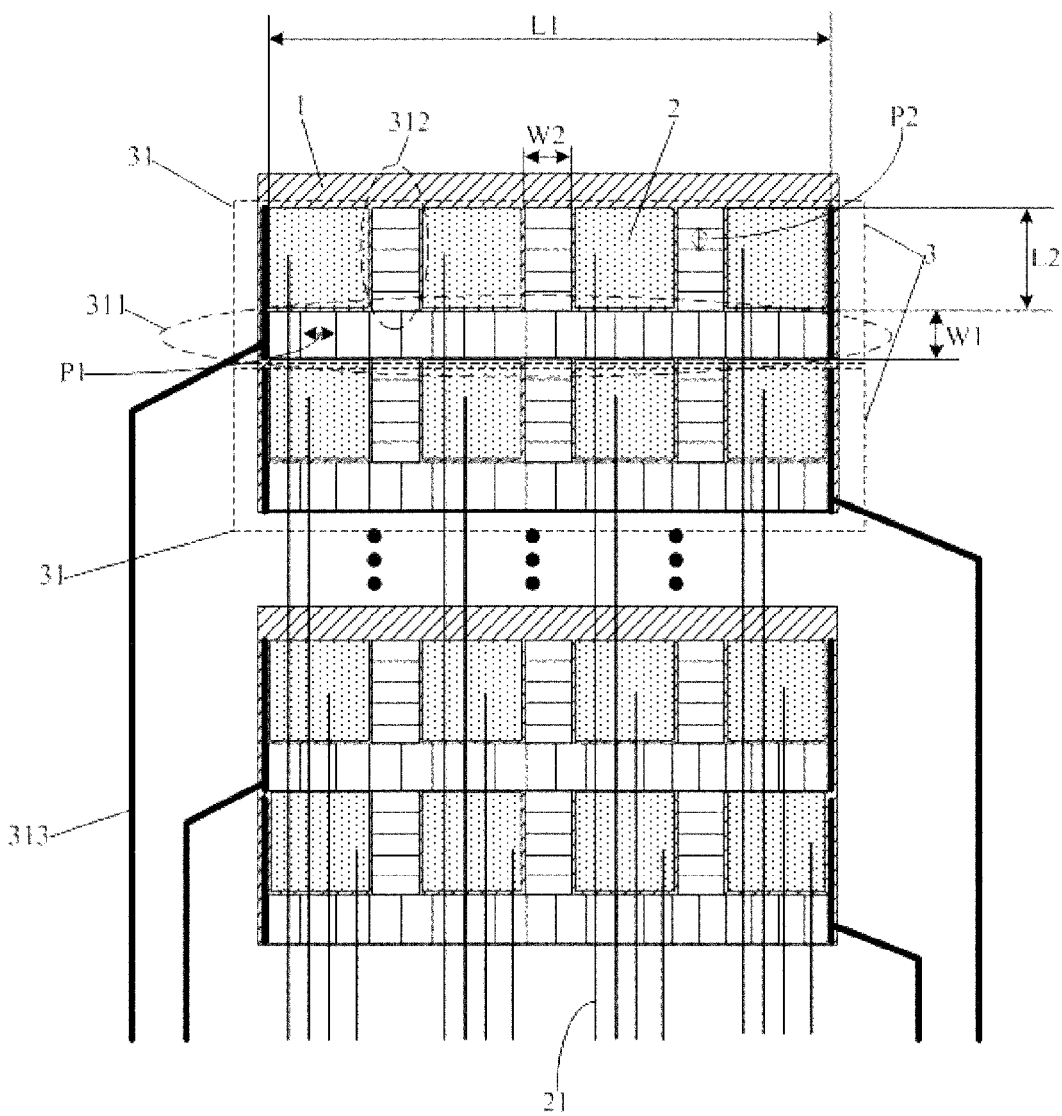
FIG. 3 B is a structural perspective top view of the self-capacitive touch screen provided by an embodiment of the present disclosure.

An embodiment of the present disclosure provides a self-capacitive touch screen, which, as illustrated in FIGS. 3A and 3B, comprises a first substrate 10 and a second substrate 20 arranged opposite to each other. A conductive layer 1 and a plurality of first touch electrodes 2 are formed on the inner side of the first substrate 10 (i.e., the side close to the second substrate 20). The conductive layer 1 includes a plurality of hollow areas that are distributed in matrixes. The plurality of first touch electrodes 2 are in one-to-one correspondence with the plurality of hollow areas, and an orthographic projection of each first touch electrode 2 on the first substrate 10 is disposed in an orthographic projection of corresponding hollow area on the first substrate. For example, the conductive layer 1 and first touch electrodes 2 are provided on a same layer, and each first electrode 2 is placed within one corresponding hollow areas of the conductive layer 1. Second touch electrodes 3 are formed in areas, which correspond to the conductive layer 1, on the second substrate 20. The second touch electrodes 3 and the first touch electrodes 2 are configured for the touch-control of the touch screen during the touch process.

Figure 4:
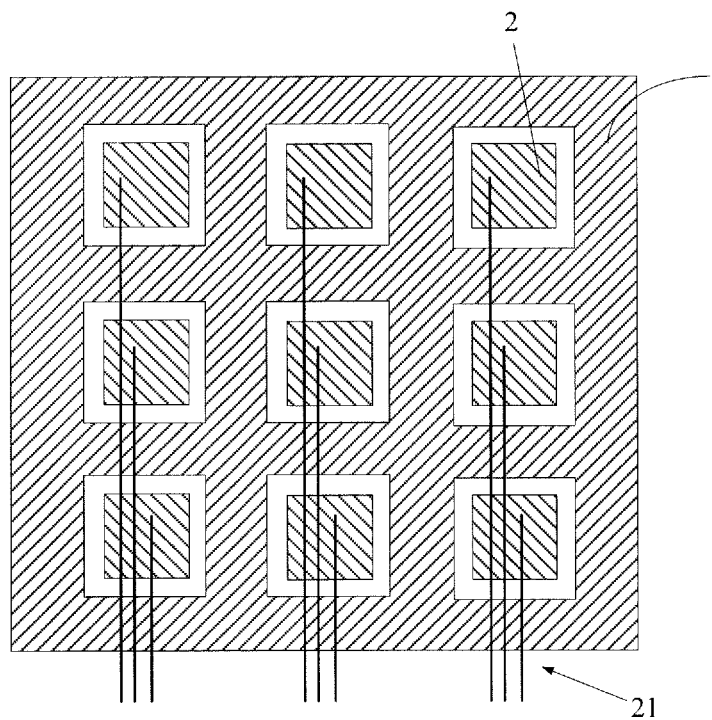
FIG. 4 shows the plan view of the arrangement of a conductive layer and first touch electrodes on a first substrate in an embodiment.

FIG. 4 shows the plan view of the arrangement of the conductive layer 1 and the first touch electrodes 2 on the first substrate in an embodiment. As shown, each of the first touch electrodes is connected to a drive IC via a conductive wire (e.g., the lead 21).

With the arrangement of the second touch electrodes 3, the area of the touch electrodes occupied by the conductive layer 1 can be compensated, so that the overall area of the touch electrodes can be increased, and hence the touch performance of the touch screen can be improved. Meanwhile, the touch accuracy and the touch effect of the touch screen can be also improved. Therefore, the touch screen can satisfy the high-accuracy touch requirement of passive pens and fingers.

In the embodiment, for instance, the first substrate 10 is an array substrate, and the second substrate 20 is a color filter (CF) substrate. For instance, the self-capacitive touch screen is an LCD touch screen. Of course, the second substrate 20 may also be a package cover; for instance, the self-capacitive touch screen is an organic light-emitting diode (OLED) touch screen.

It should be noted that: the conductive layer 1 and the first touch electrodes 2 may be arranged in a same layer or may be arranged in different layers; and due to the arrangement of the conductive layer 1, the area of the touch electrodes formed on the first substrate can be reduced, and hence the ground load of the touch electrodes can be reduced accordingly to satisfy the design requirement. In addition, the conductive layer 1 and the first touch electrodes 2 are used as a common electrode as a whole during the display process. That is to say, due to the arrangement of the conductive layer 1, the area of the common electrode of the touch screen can also be reduced, and hence the touch screen can realize normal display.

In the embodiment, the second touch electrode 3 may include a plurality of touch sub-electrodes 31. Each touch sub-electrode 31 corresponds to the conductive layer 1 forming one row of hollow areas. Each touch sub-electrode 31 includes a first sub-electrode 311 and a plurality of second sub-electrodes 312, and the first sub-electrode 311 is connected with the second sub-electrodes 312 respectively.

The first sub-electrode 311 corresponds to the conductive layer 1 between two adjacent rows of first touch electrodes 2. The plurality of second sub-electrodes 312 respectively correspond to the conductive layer 1 between two adjacent first touch electrodes 2 in one row of first touch electrodes 2. In this configuration, the second touch electrodes 3 can be distributed in areas not provided with the first touch electrodes 2, and hence blind touch areas of the touch screen can be avoided. Meanwhile, the touch performance of the touch screen can also be improved.

Figure 5:
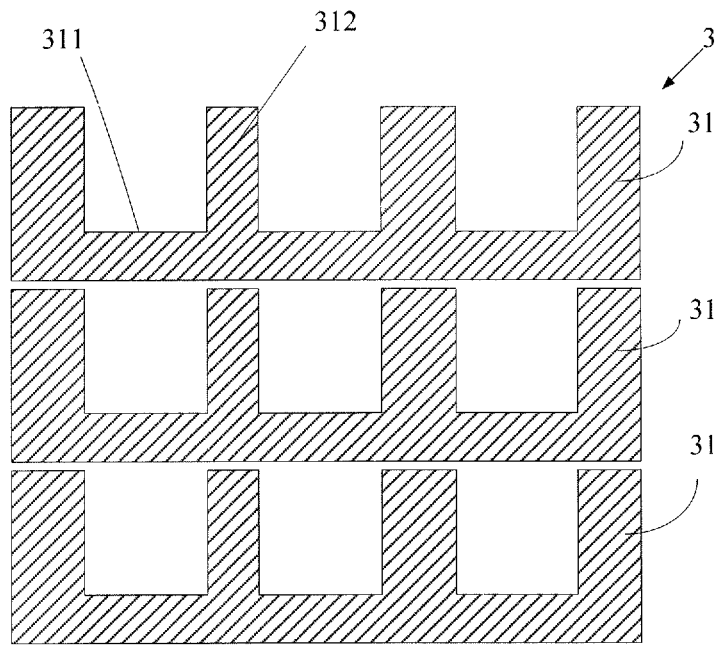
FIG. 5 shows the plan view of the arrangement of a second touch electrode on a second substrate in an embodiment.

FIG. 5 shows the arrangement of the second touch electrode 3 on the second substrate in an embodiment.

In the embodiment, the width of the first sub-electrode 311 perpendicular to the row direction of the first touch electrodes 2 is equal to the spacing W1 between two adjacent rows of first touch electrodes 2; and the width of the second sub-electrode 312 perpendicular to the column direction of the first touch electrode 2 is equal to the spacing W2 between two adjacent first touch electrodes in one row of first touch electrodes. The length of the first sub-electrode 311 along the row direction of the first touch electrodes 2 is equal to the length L1 of one row of first touch electrodes 2; and the length of the second sub-electrode 312 along the column direction of the first touch electrodes 2 is equal to the length L2 of the first touch electrode 2 along the column direction thereof. In this way, the second touch electrodes 3 can just cover areas not covered by the first touch electrodes 2, so that blind touch areas of the touch screen can be avoided. Meanwhile, the touch performance of the touch screen can also be improved.

In the embodiment, both the first sub-electrode 311 and the second sub-electrode 312 have a grid structure. Grids for forming the first sub-electrode 311 are distributed along the row direction of the first touch electrodes 2, and grids for forming the second sub-electrode 312 are distributed along the column direction of the first touch electrode 2. Thus, the influence of the first sub-electrodes 311 and the second sub-electrodes 312 on the light transmittance in the display process of the touch screen can be reduced, and hence the influence of the first sub-electrodes 311 and the second sub-electrodes 312 on the aperture ratio in the display process of the touch screen can be reduced.

In the embodiment, both the first sub-electrode 311 and the second sub-electrode 312, for instance, have a rectangular grid structure. Rectangular grids for forming the first sub-electrode 311 have a same size, and the width of the rectangular grid along the row direction of the first touch electrode 2 is equal to the width P1 of a pixel in the self-capacitive touch screen along the row direction of the first touch electrode 2. Rectangular grids for forming the second sub-electrode 312 have a same size, and the width of the rectangular grid along the column direction of the first touch electrode 2 is equal to the length P2 of a pixel in the self-capacitive touch screen along the column direction of the first touch electrode 2. Thus, grid lines of the first sub-electrode 311 and the second sub-electrode 312 will basically not shield pixels, and hence not only the touch performance of the touch screen can be improved but also the aperture ratio of the touch screen can be guaranteed to be basically not affected.

In the embodiment, both the first sub-electrode 311 and the second sub-electrode 312 are, for instance, made of a transparent conductive material or a metallic conductive material. As both the first sub-electrode 311 and the second sub-electrode 312 have a grid structure, even both the first sub-electrode 311 and the second sub-electrode 312 are made of a metallic conductive material (light-tight material), the light transmittance of the touch screen cannot be greatly affected.

In the embodiment, a black matrix 70 is also formed on the second substrate 20 in areas corresponding to the first sub-electrodes 311 and the second sub-electrodes 312, and orthographic projections of the first sub-electrodes 311 and the second sub-electrodes 312 on the second substrate 20 are disposed in orthographic projections of the black matrix 70 on the second substrate 20, namely both the first sub-electrodes 311 and the second sub-electrodes 312 are shielded by the black matrix 70. Thus, the aperture ratio of the touch screen cannot be affected by the first sub-electrodes 311 and the second sub-electrodes 312, namely the aperture ratio of the touch screen can be maintained unchanged, and hence the touch screen can realize normal display.

In the embodiment, the self-capacitive touch screen further comprises a touch drive element/component (e.g., a driving IC). For instance, a touch drive element 50 is formed on the first substrate 10. Each touch sub-electrode 31 is connected to the touch drive element through a first lead 313; and each first touch electrode 2 is connected to the touch drive element through a second lead 21. The touch drive element is configured to input touch drive signals to the first touch electrodes 2 and the touch sub-electrodes 31 during the touch process and determine the touch position by the detection of the capacitance variation of the first touch electrodes 2 and the touch sub-electrodes 31. Thus, the second touch electrodes 3 can have the function of assisting the first touch electrodes 2 in the touch-control of the touch screen. That is to say, when a finger touches a specific touch sub-electrode 31 on the second touch electrode 3, the ground capacitance of the touch sub-electrode 31 is changed, and the touch drive element determines the touch position of the finger according to the ground capacitance variation of the touch sub-electrode 31. By arrangement of the second touch electrodes 3, the touch performance of the touch screen can be improved, and meanwhile, higher touch accuracy and better touch effect of the touch screen can also be obtained.

Connecting ends of the first lead 313 and the second lead 21 for the touch drive element are connected and conducted with the touch drive element by the doping of conductive heads (e.g., metal balls) in sealant.

In the embodiment, the self-capacitive touch screen may further comprise a display drive element/component (e.g., a drive IC). For instance, a display drive element 60 may also be formed on the first substrate 10. The first touch electrodes 2 and the conductive layer 1 are respectively connected with the display drive element. The display drive element is configured to input common voltage signals to the first touch electrodes 2 and the conductive layer 1, namely both the first touch electrodes 2 and the conductive layer 1 are used as a common electrode during the display process. Compared with the prior art, as the area of the common electrode is not changed in the display process of the touch screen, the normal display of the touch screen can be guaranteed. In one example, the touch drive element and the display drive element may be formed integrally, or implemented by a same integrated circuit (IC) chip.

It should be noted that FIG. 3 is a schematic perspective top view of the self-capacitive touch screen provided by the embodiment, namely FIG. 3 only illustrates the arrangement positions of the devices in the self-capacitive touch screen, for instance, the second lead 21 is generally disposed at the rear side of the first touch electrode 2 and can only be seen from the perspective top view of the self-capacitive touch screen.

Due to the arrangement of the second touch electrodes, the area of the touch electrodes occupied by the conductive layer can be compensated, so that the overall area of the touch electrodes can be increased, and hence the touch performance of the touch screen can be improved. Meanwhile, due to the arrangement of the second touch electrodes, the touch accuracy and the touch effect of the touch screen can also be improved, and hence the touch screen can satisfy the high-accuracy touch requirement of passive pens and fingers.

Another embodiment of the present disclosure provides a display device, which comprises the self-capacitive touch screen provided by any of the above-mentioned embodiment.

By adoption of the self-capacitive touch screen provided by the embodiment 1, the touch performance of the display device can be improved, and meanwhile, the normal display of the display device can also be guaranteed.

The display device provided by the embodiment of the present disclosure may be any product or component with self-capacitive touch function such as an LCD panel, an LCD TV, a display, an OLED panel, an OLED TV, a mobile phone and a navigator.

The foregoing is only the preferred embodiments of the present disclosure and not intended to limit the scope of protection of the present disclosure. The scope of protection of the present disclosure should be defined by the appended claims.

The application claims priority to the Chinese patent application No. 201510038839.9, filed Jan. 26, 2015, the disclosure of which is entirely incorporated herein by reference as part of the application.

What is claimed is:

1. A self-capacitive touch screen, comprising a first substrate and a second substrate arranged opposite to each other, wherein
    a conductive layer and a plurality of first touch electrodes are formed on the first substrate; the conductive layer includes a plurality of hollow areas distributed in a matrix; the plurality of first touch electrodes are in one-to-one correspondence with the plurality of hollow areas; an orthographic projection of each first touch electrode on the first substrate is disposed in an orthographic projection of one corresponding hollow area on the first substrate;
    second touch electrodes are formed in areas, which correspond to the conductive layer, on the second substrate; and the second touch electrodes and the first touch electrodes are configured for the touch-control of the touch screen in the touch process.

2. The self-capacitive touch screen according to claim 1, wherein the second touch electrode includes a plurality of touch sub-electrodes; each touch sub-electrode corresponds to the conductive layer forming one row of hollow areas;
    each touch sub-electrode includes a first sub-electrode and a plurality of second sub-electrodes, and the first sub-electrode is connected the second sub-electrodes respectively; the first sub-electrode corresponds to the conductive layer between two adjacent rows of first touch electrodes; and the plurality of second sub-electrodes respectively correspond to the conductive layer between two adjacent first touch electrodes in one row of first touch electrodes.

3. The self-capacitive touch screen according to claim 2, wherein a width of the first sub-electrode perpendicular to a row direction of the first touch electrode is equal to a spacing between two adjacent rows of first touch electrodes;
- a width of the second sub-electrode perpendicular to a column direction of the first touch electrode is equal to a spacing between two adjacent first touch electrodes in one row of first touch electrodes;
- a length of the first sub-electrode along the row direction of the first touch electrode is equal to a length of one row of first touch electrode; and a length of the second sub-electrode along a column direction of the first touch electrode is equal to the length of the first touch electrode along the column direction.

4. The self-capacitive touch screen according to claim 3, wherein both the first sub-electrode and the second sub-electrodes have a grid structure; grids for forming the first sub-electrode are distributed along the row direction of the first touch electrodes; and grids for forming the second sub-electrodes are distributed along the column direction of the first touch electrode.

5. The self-capacitive touch screen according to claim 4, wherein both the first sub-electrode and the second sub-electrodes have a rectangular grid structure;
- rectangular grids for forming the first sub-electrode have a same size, and a width of the rectangular grid along the row direction of the first touch electrode is equal to a width of a pixel in the self-capacitive touch screen along the row direction of the first touch electrode; and
- rectangular grids for forming the second sub-electrodes have a same size, and a width of the rectangular grid along the column direction of the first touch electrode is equal to a length of a pixel in the self-capacitive touch screen along the column direction of the first touch electrode.

6. The self-capacitive touch screen according to claim 5, wherein both the first sub-electrode and the second sub-electrode are made of a transparent conductive material or a metallic conductive material.

7. The self-capacitive touch screen according to claim 6, wherein a black matrix is formed on the second substrate in areas corresponding to the first sub-electrode and the second sub-electrodes; and orthographic projections of the first sub-electrode and the second sub-electrodes on the second substrate are disposed in orthographic projection of the black matrix on the second substrate.

8. The self-capacitive touch screen according to claim 2, further comprising a touch drive element, wherein each touch sub-electrode is connected to the touch drive element through a first lead; each first touch electrode is connected to the touch drive element through a second lead; and
- the touch drive element is configured to input a touch drive signal into the first touch electrode and the touch sub-electrode in the touch process and determine the touch position by detection of capacitance variation of the first touch electrode and the touch sub-electrode.

9. The self-capacitive touch screen according to claim 1, further comprising a display drive element, wherein the first touch electrode and the conductive layer are respectively connected with the display drive element which is configured to input a common voltage signal into the first touch electrode and the conductive layer during a display process.

10. A display device, comprising the self-capacitive touch screen according to claim 1.

* * * * *